United States Patent
Zuraski, Jr. et al.

(10) Patent No.: US 6,510,508 B1
(45) Date of Patent: Jan. 21, 2003

(54) TRANSLATION LOOKASIDE BUFFER FLUSH FILTER

(75) Inventors: Gerald D. Zuraski, Jr.; Michael T. Clark, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/595,597

(22) Filed: Jun. 15, 2000

(51) Int. Cl.$^7$ .......................... G06F 12/12; G06F 12/10
(52) U.S. Cl. ...................................... 711/207; 711/135
(58) Field of Search ................................ 711/135, 206, 711/207

(56) References Cited

U.S. PATENT DOCUMENTS

| | | | |
|---|---|---|---|
| 4,053,948 A | 10/1977 | Hogan et al. | 364/200 |
| 4,669,043 A | 5/1987 | Kaplinsky | 364/200 |
| 4,700,291 A | 10/1987 | Saito | 364/200 |
| 5,060,137 A | 10/1991 | Bryg et al. | 364/200 |
| 5,428,757 A | 6/1995 | Sutton | 395/400 |
| 5,623,619 A | 4/1997 | Witt | 395/403 |
| 5,671,444 A | 9/1997 | Akkary et al. | 395/872 |
| 5,680,572 A | 10/1997 | Akkary et al. | 395/453 |
| 5,751,996 A | 5/1998 | Glew et al. | 711/145 |
| 5,752,274 A | 5/1998 | Garibay, Jr. et al. | 711/206 |
| 5,761,691 A | 6/1998 | Witt | 711/3 |
| 5,895,501 A | 4/1999 | Smith | 711/207 |
| 5,924,125 A | 7/1999 | Arya | 711/205 |
| 6,021,481 A | 2/2000 | Eickemeyer et al. | 711/207 |
| 6,216,214 B1 * | 4/2001 | Bryg et al. | 711/207 |

FOREIGN PATENT DOCUMENTS

| | | |
|---|---|---|
| DE | 44 16 658 | 5/1994 |
| EP | 93302453 | 3/1993 |
| GB | 2 210 479 | 6/1989 |

OTHER PUBLICATIONS

Pentium Pro Family Developer's Manual, vol. 3: Operating System Writer's Manual, Intel, 1996, pp. 11–13 thru 11–26.

Patterson et al., Computer Architecture: A Quantitative Approach, Morgan Kaufmann Publishers, 1990, pp. 437–438.

Alpha 21164 Microprocessor Hardware Reference Manual, Dec. 1998, Compaq Computer Corporation, Ch. 1, p. 4; Ch. 2, pp. 7, 8, 10–13; Ch. 5, p. 7, 9, 33, 43; Ch. 7, p. 7; Glossary, p. 1.

Alpha Architecture Handbook, Oct. 1998, Compaq Computer Corporation, Ch. 5, p. 4, 25, 26, Table 11–2.

International Search Report for application No. PCT/US 01/07591 dated Oct. 17, 2001.

* cited by examiner

Primary Examiner—Kevin L. Ellis
(74) Attorney, Agent, or Firm—Conley, Rose & Tayon, PC; Lawrence J. Merkel

(57) ABSTRACT

A translation lookaside buffer (TLB) flush filter. In one embodiment, a central processing unit includes a TLB for storing recent address translations. A TLB flush filter monitors blocks of memory from which address translations have been loaded and cached in the TLB. The TLB flush filter is configured to detect if any of the underlying address translations in memory have changed. If no changes have occurred, the TLB flush filter may then prevent a flush of the TLB following the next context switch. If changes have occurred to the underlying address translations, the TLB flush filter may then allow a flush of the TLB following a context switch.

25 Claims, 8 Drawing Sheets

CAM Entry:

| V | PDP | Tag [ 35:6 ] |
|---|---|---|

RAM Entry:

| Valid Bit | Base Address Register Tag [3:0] |
|---|---|

TRANSLATION LOOKASIDE BUFFER FLUSH FILTER

BACKGROUND OF THE INVENTION

1. Field of the Invention

This invention relates to processors, and more particularly, to a translation lookaside buffer used for storing address translations.

2. Description of the Relevant Art

Computer systems using memory management may have the need to translate virtual addresses into physical addresses in order to perform a memory access. Typical computer programs are written to address a memory model, and thus issue virtual memory addresses when performing a memory access. A virtual memory address must then be translated into a physical memory address in order to access the information required by the program. Various mechanisms exist in different computer architectures for performing virtual-to-physical address translations.

One problem with performing address translations is latency. In addition to the time required to access the information from memory, a number of clock cycles may be used to perform the address translation. This latency penalty may become severe or unacceptable in programs that perform frequent memory accesses. One common method of reducing the latency penalty from translating addresses is to use a translation lookaside buffer (TLB). A TLB is a small memory located within a processor, and is used to store virtual-to-physical address translations. A typical TLB may store both the virtual and physical addresses for the most recent address translations. When a program attempts a memory access, it may issue a virtual address. The TLB may then be searched for the issued virtual address. If found, a physical address corresponding to the issued virtual address may then be used to access main memory. Typically, translations are provided on a page basis (e.g. 4 kilobytes, 2 megabytes, 4 megabytes, etc.) and the TLB may store the page portion of the virtual address and page portion of the corresponding physical address.

Despite the advantages provided by a TLB, problems still exist. One such problem occurs on a context switch. In many processors employing a TLB, a context switch results in the removal of all translations stored in the TLB. This is known as a TLB flush. The TLB is flushed because one or more of the address translations corresponding to the context switched out of may be modified, and thus the translations cached in the TLB may no longer be the correct translations. Unfortunately, as the new process runs following the context switch, each memory access requires an address translation, and the TLB must be reloaded. The address translations and reloading of the TLB may result in large latency penalties. These latency penalties may be exacerbated by programs or operating systems that require frequent context switches.

The address translations stored in a TLB are supported by underlying data structures stored in memory. For example, computers that employ paging may store data structures in a page table. Such data structures may include the translations which are loaded into the TLB. While these data structures may be altered for a context which was switched out via a context switch, frequently these data structures are not altered. Despite the fact that the data structures are not altered in all instances, a typical processor may still perform a flush of the TLB. A TLB flush under such circumstances may not be necessary, and may result in large latency penalties as described above.

SUMMARY OF THE INVENTION

The problems outlined above may in large part be solved by a translation lookaside buffer (TLB) flush filter as described herein. In one embodiment, a processor includes a TLB for storing recent address translations. A TLB flush filter monitors blocks of memory from which address translations have been loaded and cached in the TLB. The TLB flush filter is configured to determine if any of the underlying address translations in memory have changed. If no changes have occurred, the TLB flush filter may then prevent a flush of the TLB on a context switch. If changes have occurred to the underlying address translations, the TLB flush filter may then allow a flush of the TLB following a context switch.

In one embodiment, the TLB flush filter uses a region table to track blocks of memory from which address translations have been cached in the TLB. The TLB flush filter may monitor for modifications to the underlying address translations in various blocks of memory (typically page tables or directories). A first context switch may result in a TLB flush, and may then activate the TLB flush filter. TLB flushes may be blocked by the TLB flush filter on subsequent context switches if no changes to the underlying address translations in memory are detected in the region table.

The method of operating the TLB flush filter also includes tracking context switches. In one embodiment, this may be performed by tagging the values of a base address register. The base address register may be configured to store the base address of a page table associated with a particular context. The tag and the actual value of the register may be stored as entries in the region table, and may correspond to specific memory regions. The tag may be stored along with the other data in a TLB entry to associate the translation in that entry with a context. In this way, translations for many contexts may reside in the TLB at the same time. Only translations with context tags that match the current context tag would be available to the current context.

The region table used in one embodiment is implemented with a content addressable memory (CAM) and a random access memory (RAM). The CAM may be used to store information regarding the memory structures from which address translations are loaded into the TLB. Such information may include page directory information and page table information. The RAM may be used to store values of the base address register and its associated tag. A counter may also be used to track the number of base address entries. When the counter overflows, the TLB flush filter may then be deactivated, and the region table cleared. A region counter may also be used to record the number of entries stored in the CAM. An overflow of this counter may also cause the TLB flush filter to be deactivated and the region table cleared. Following the deactivation of the TLB flush filter, a context switch may result in a TLB flush. The TLB flush filter may then be activated once again.

Thus, in various embodiments, the TLB flush filter may prevent unnecessary flushes to a TLB. Since unnecessary flushes to a TLB may be prevented, a new context may be able to use previously cached address translations when none of the underlying address translations have changed. In many cases, this may eliminate the need to repeat the process of translating a virtual address to a physical address and caching it into the TLB. Thus, the latency for a large number of memory accesses may be significantly reduced, and may thereby allow for a significant increase in processor performance.

BRIEF DESCRIPTION OF THE DRAWINGS

Other objects and advantages of the invention will become apparent upon reading the following detailed description and upon reference to the accompanying drawings in which.

Figure 1:
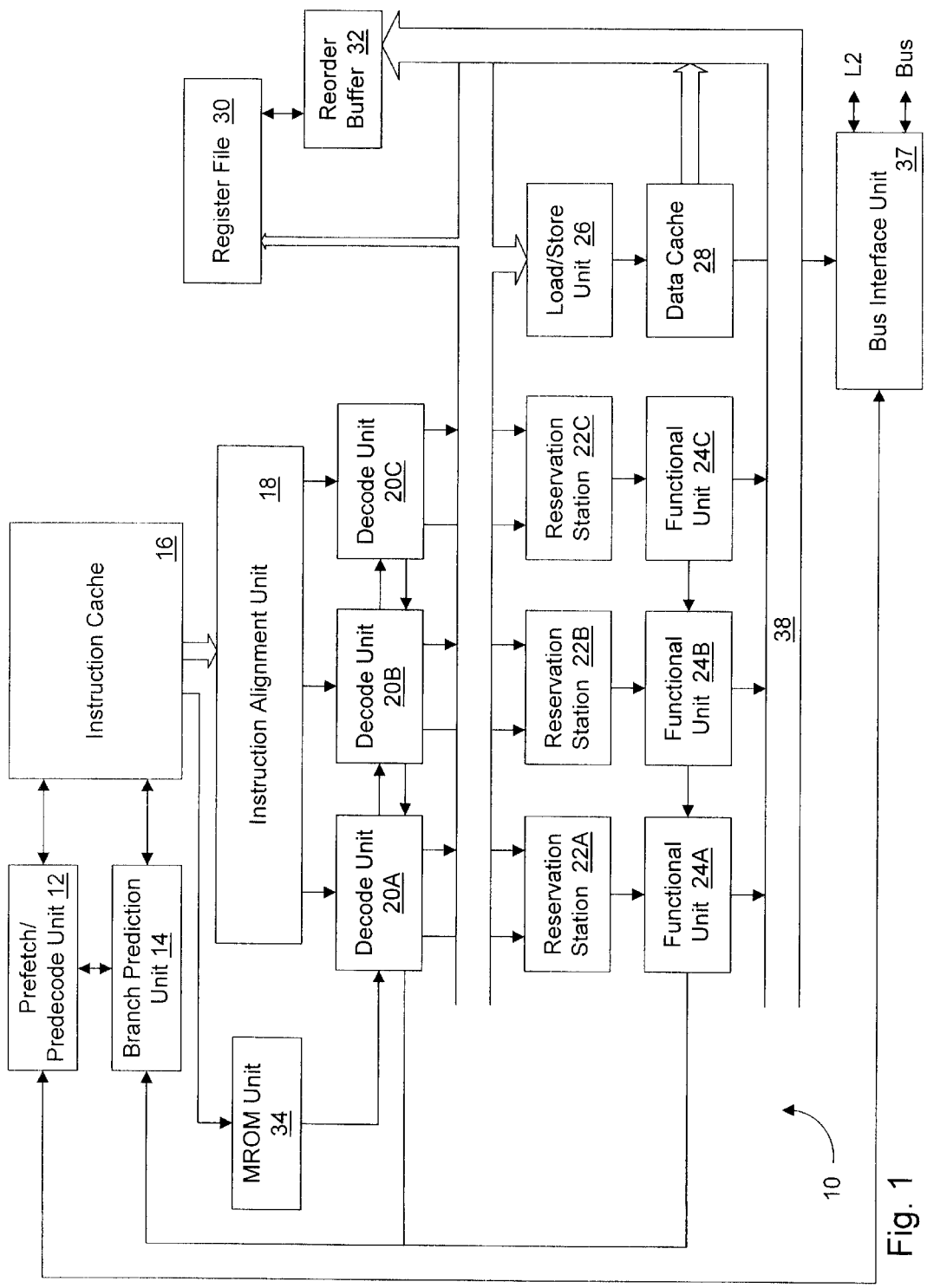
FIG. 1 is a block diagram of one embodiment of a processor in which a TLB flush filter could be implemented.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION OF THE INVENTION

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
|---|---|
| End bits | 00001 |
| Functional bits | 11000 |

MROM instructions are instructions which are determined to be too complex for decode by decode units 20.

MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is fill, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Figure 2:
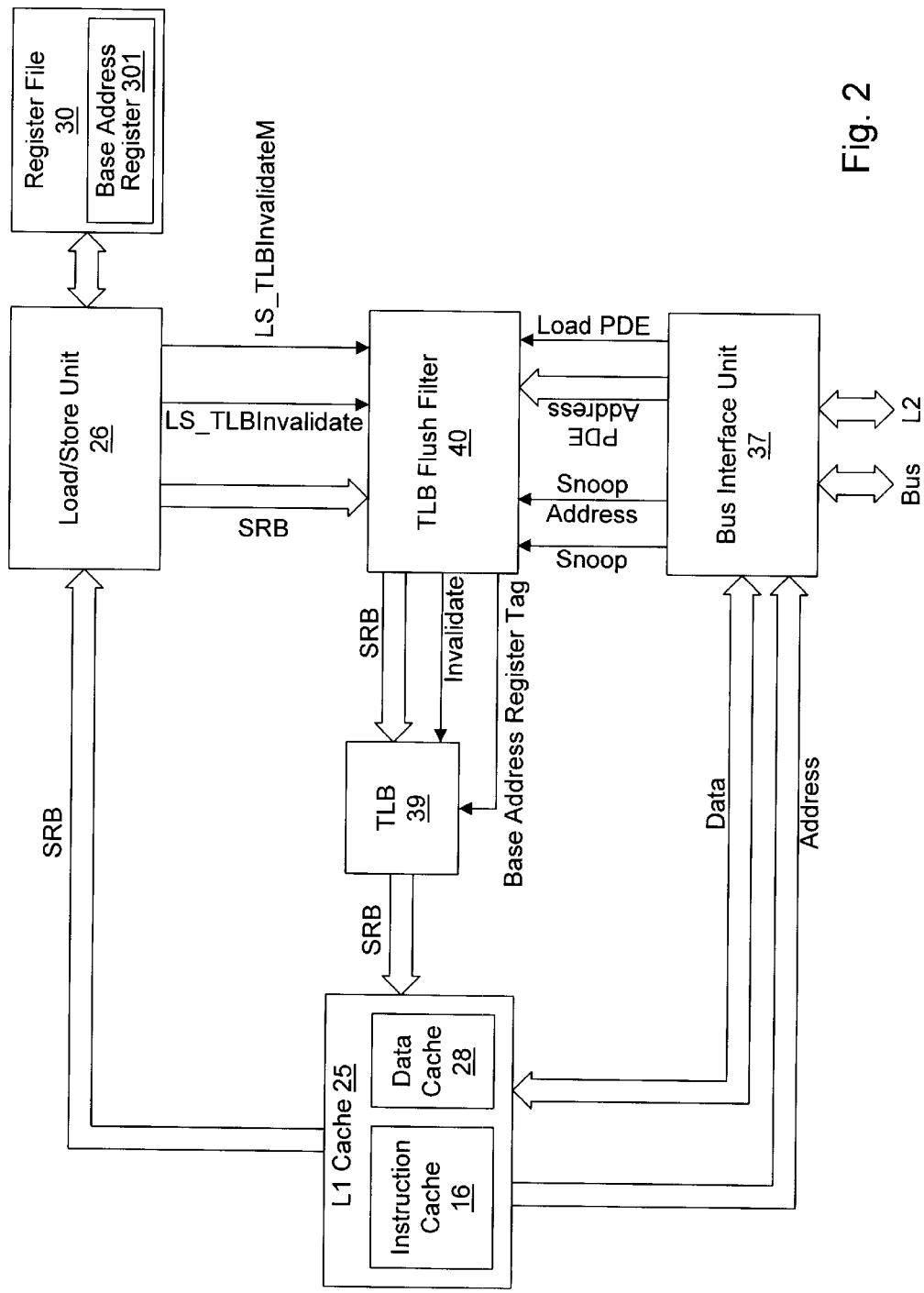
FIG. 2 is a block diagram of one embodiment of a portion of a processor employing a TLB flush filter.

Moving now to FIG. 2, a block diagram of one embodiment of a portion of processor 10 which employs a TLB flush filter is shown. TLB flush filter 40 is coupled to load/store unit 26, bus interface unit 37, L1 cache 25, and TLB 39. L1 cache 25 may include, for example, an instruction cache 16 and a data cache 28. In some embodiments, instruction cache 16 and data cache 28 of L1 cache 25 may each be associated with their own separate TLB. These TLBs may be integrated into each cache. Load/store unit 26 is coupled to register file 30. Among the registers of register file 30 is a base address register 301. Base address register 301 may store a base address of a page table for the currently running context. Alternatively, base address register 301 may store a base address of a page directory pointer table, or other address information associated with the currently running context. Base address register 301 may be updated during a context switch.

TLB flush filter 40 is configured to monitor blocks of memory which include address translations that may be loaded into TLB 39. If TLB flush filter 40 detects changes to one or more address translations in the monitored blocks of memory, it may then allow TLB 39 to be flushed following the next context switch. In the embodiment shown, TLB flush filter may assert an Invalidate signal in order to allow a flush of TLB 39. Load/store unit 26 may also cause TLB 39 to be flushed by asserting a signal (shown here as LS_TLBInvalidate). This signal, when asserted by load/store unit 26 may cause an unconditional flush of TLB 39, or allow the TLB to be flushed on the next context switch. Some of the possible causes of an unconditional flush will be discussed below with reference to FIG. 5.

TLB flush filter 40 may be activated by a first context switch. This first context switch may occur after initial boot of a computer system, or following a deactivation of the flush filter. The first context switch may result in a flush of TLB 39. Subsequent to the first context switch, flushes of TLB 39 may be filtered by TLB flush filter 40.

TLB flush filter 40 is coupled to bus interface unit 37, and may receive information concerning those blocks of memory that it monitors. In the embodiment shown, TLB flush filter 40 may receive a page directory entry from bus interface unit 37. In various embodiments, TLB flush filter 40 may also receive information concerning page directory entries, page directory pointers, page tables, or other data structures which may be used for address translations. Generally, any address of a block of memory storing address translation info may be provided to TLB flush filter 40 by bus interface unit 37. TLB flush filter 40 may also receive a snoop (or probe) request signal from bus interface unit 37, as well as a snoop address, for searches of a region table (as will be detailed below). TLB flush filter 40 may also receive notification from load/store unit 26 when a context switch occurs, as the load/store unit may propagate the new address stored in base address register 301 around the special register bus (SRB) ring.

In general, the SRB ring is a bus that may be used for communication with special registers. A variety of special registers may be located in various units throughout the processor. In the embodiment shown, load/store unit 26 serves as a bus master for the SRB ring, and may thereby control read and write operations involving special registers. The implementation of the SRB ring may allow special registers to be placed closer to the logic which uses them, and yet still under control of load/store unit 26.

Figure 3:
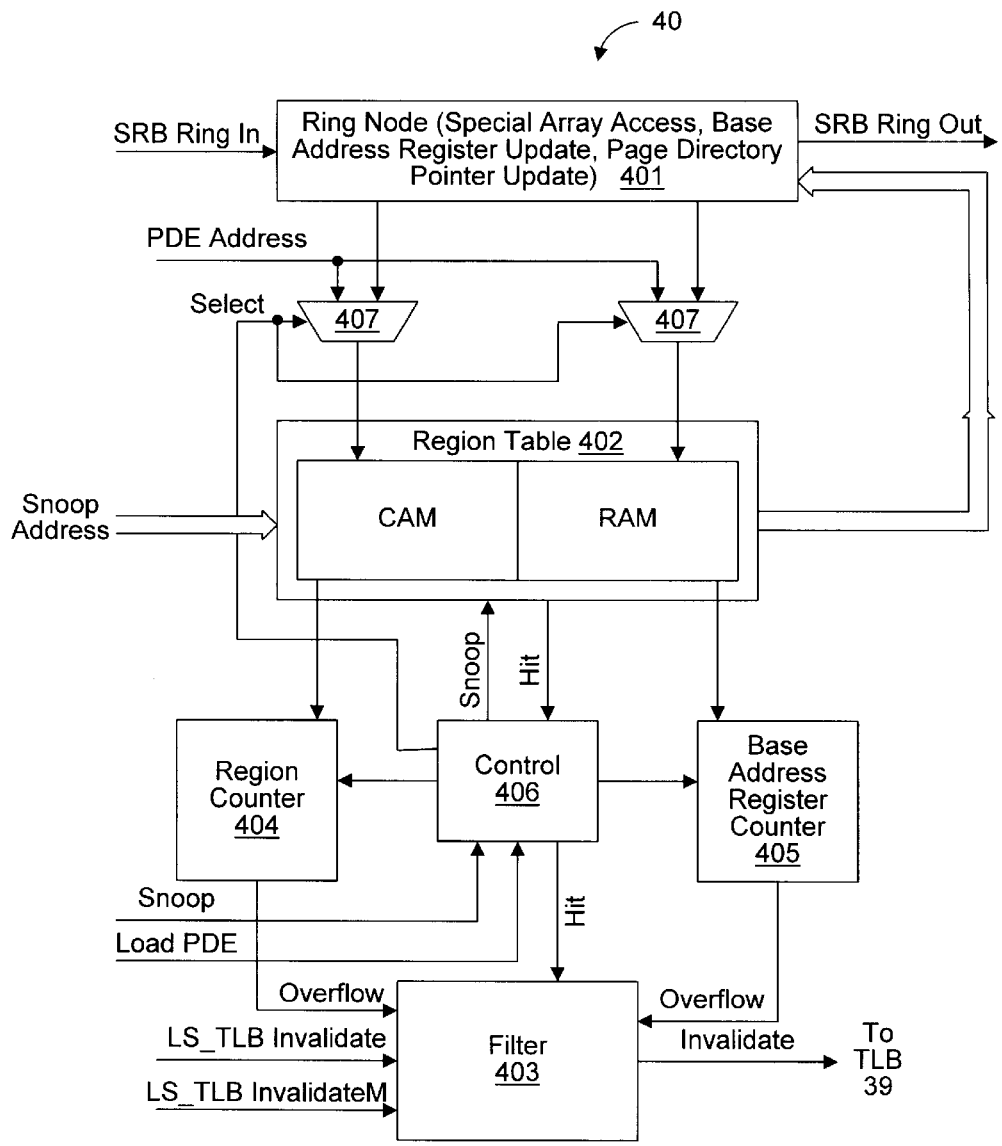
FIG. 3 is a block diagram of one embodiment of a TLB flush filter.

Turning now to FIG. 3, a block diagram of one embodiment of a TLB flush filter is shown. TLB flush filter 40 includes a ring node 401, region table 402, and filter circuit 403. Filter circuit 403 is coupled to TLB 39, and may assert a signal to invalidate, or flush, the TLB. Region table 402 includes a content addressable memory (CAM) and a random access memory (RAM. The CAM portion of region table 402 may be used to store addresses, such as page directory pointers, as well as associated tags, and may store base addresses from base address register 301 (of FIG. 2) as well. The RAM portion of the region table typically stores a tag associated with the base address from base address register 301. CAM and RAM entries will be discussed in further detail below.

Entries into region table 401 may be received by TLB flush filter 40 through ring node 401, and multiplexers 407. Multiplexers 407 may also used to receive other information, such as page directory entry (PDE) attributes, as shown here. Information received through multiplexers 407 may then be stored in either the CAM or the RAM. Information from region table 402 may also be propagated into the SRB ring through ring node 401.

Two counters are also associated with region table 402. Region counter 404 is configured to count the number of entries in the CAM, while base address register counter 405 is configured to count the number of base address register tags. Each of these counters tracks the available resources in the region table. If the region table runs out of available resources, one of the counters may assert an overflow signal. For example, if each CAM entry is fill, the region counter may assert an overflow signal. This overflow signal may be used to deactivate the TLB flush filter. Similarly, if all available tags have been used for the base address register counter, it may overflow as well, thereby asserting an overflow signal which may deactivate the TLB flush filter. The first context switch following the deactivation of TLB flush filter 40 may then result in a TLB flush. When TLB flush filter 40 is deactivated, both counters may be reset by control logic 406.

As previously stated, region table 402 is configured to store a plurality of entries during operation of TLB flush filter 40. Entries in region table 402 may be used to detect modifications to page tables or other data structures that may be used to load address translations into TLB 39. To detect when the page tables or other data structures have changed, bus interface unit 37 (of FIG. 1) may probe (i.e. snoop) the region table. The probing of the region table may be a function of a coherency protocol within the processor. Generally, the snoop address is compared to the addresses recorded in the region table (e.g. the CAM). If the probe of the region table results in a hit, and the probe is for a memory access that would modify the data in a memory block being monitored by TLB flush filter 40 (indicating a potential modification of the data used to load address translations into the TLB), then the next context switch may result in a flush of TLB 39. In the embodiment shown, a flush of TLB may occur when filter circuit 403 asserts an Invalidate signal, thereby invalidating all entries currently stored in TLB 39. Typically, a hit results when a search of the region table results in a match for one of the entries stored in the CAM. If no hit results from the probe, TLB flush filter 40 may prevent a TLB flush following the next context switch.

Figure 4:
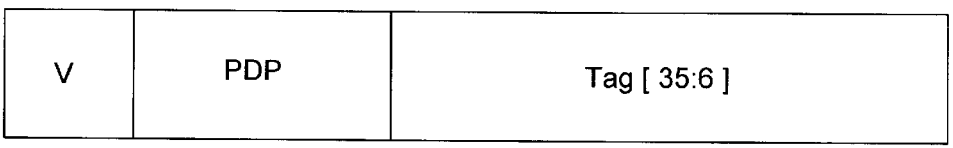
FIG. 4 is a diagram illustrating region table entries for one embodiment of the TLB flush filter.
Figure 4:
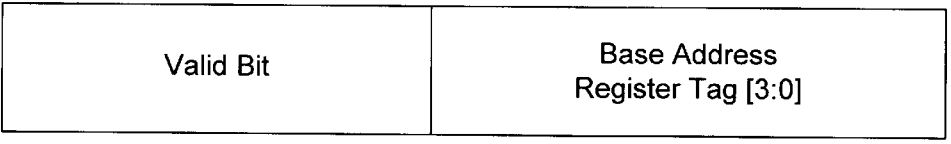

Moving now to FIG. 4, a diagram illustrating region table entries for one embodiment of the TLB flush filter is shown. Each region table entry includes a CAM entry 402-C and a RAM entry 402-R. CAM entry 402-C includes a valid bit (V), a page directory pointer (PDP) bit, and a tag. In various other embodiments, CAM entries may also include other types of information associated with a memory address, such as attribute and protection information. The tag of CAM entry 402-C is typically an address corresponding to an address translation that is present in the TLB. This address may be, for example, a page directory pointer, or a page table pointer from a page directory entry, or a base address from the base address register. In one embodiment, the address may be a linear address that corresponds to a physical address in memory. If the address indicated by the tag is for a page directory pointer, the PDP bit may be set. If the address indicated by the tag is for a page directory entry, the PDP bit may be clear. The valid bit may be set to indicate that the address indicated by the tag is valid for an address translation stored in either the TLB or a page table. The addresses stored in the CAM entry may be probed by a bus interface unit as described above, thereby allowing TLB flush filter 40 to determine if any modifications have occurred to a page table or other data structure from which address translations have been loaded into the TLB.

RAM entry 402-R includes a valid bit and a base address register tag. In the embodiment shown, the base address register tag may be associated with a base address register entry that may be stored in the CAM. The base address value stored in the CAM may be the base address for a page table (or other data structure) of a previously encountered context or the currently running context. The base address register tag in this embodiment is simply a number that corresponds to the base address. Following each change of the base address register (which typically occurs with each context switch), the new value of the register is compared with older values that have occurred since the last TLB flush which are stored in the region table. If no match is found (i.e. a miss), the value of the register may be assigned a tag and stored in the CAM, with the associated tag stored in the RAM. A match indicates that the current value of the register is already stored in the region table. Thus, if a previously encountered context is resumed by the processor, the previously used address translations may be used again. No new tag need be assigned if there is a match.

Figure 5:
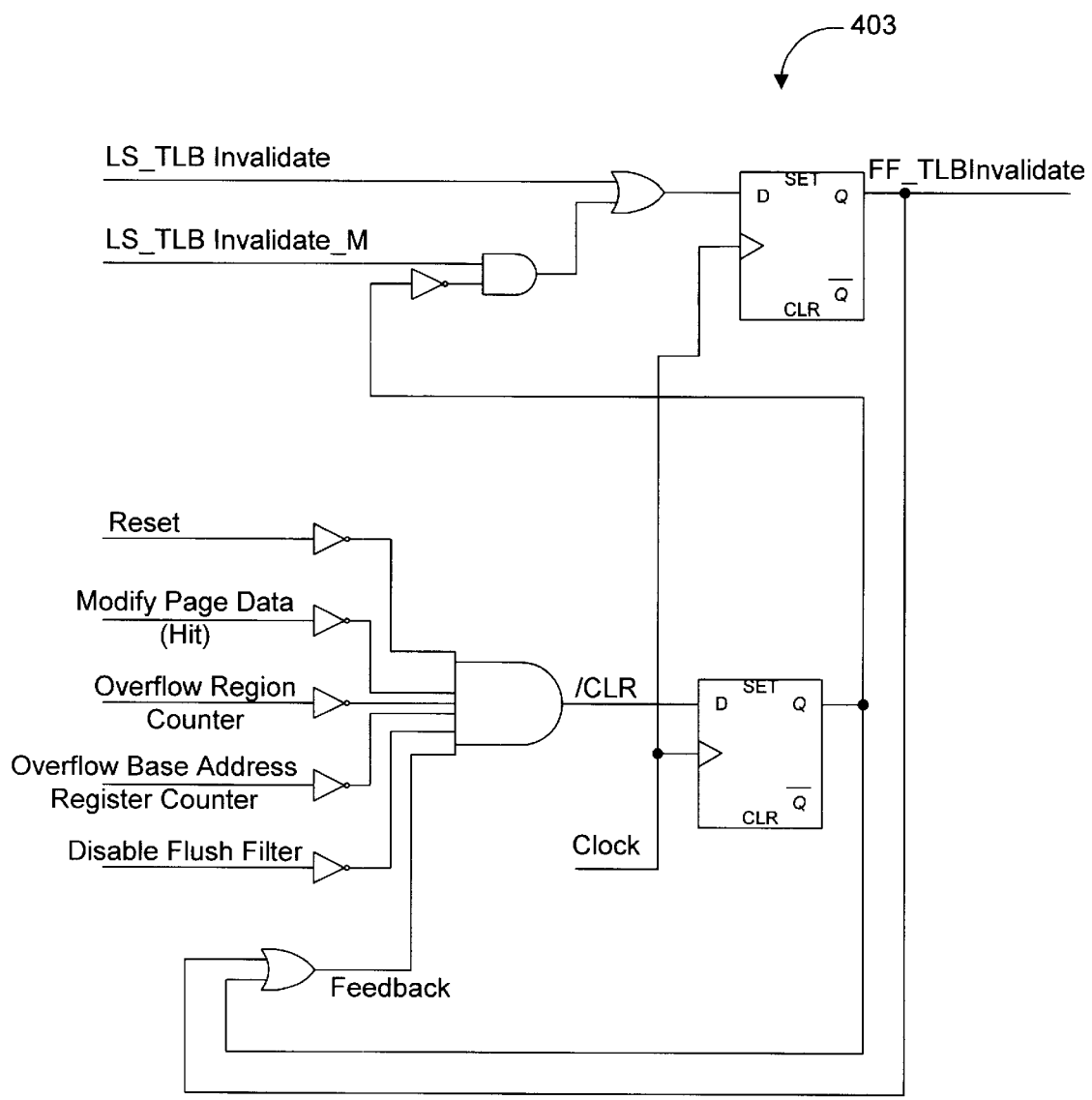
FIG. 5 is a logic diagram illustrating the logic for operating one embodiment of the TLB flush filter.

FIG. 5 is a logic diagram illustrating the logic for operating one embodiment of the filter circuit 403. Filter circuit 403 includes logic that allows a flush of the TLB to occur only when certain conditions are met. Filter circuit 403 is configured to receive LS_TLBInvalidate and LS_TLBInvalidateM signals from load/store unit 26 of FIG. 1. The LS_TLBInvalidate signal may cause an unconditional flush of the TLB, regardless of whether the TLB flush filter is activated. Various changes in the operation of the processor may necessitate a flush of the TLB. These conditions include, but are not limited to, turning off paging, turning on global paging, changing of memory types or changing memory attributes. When asserted, the LS_TLBInvalidate signal may propagate through the OR gate and the D flip-flop shown in the diagram. This may then cause the FF_TLBInvalidate signal to be asserted (this signal is equivalent to the Invalidate signal shown in FIGS. 2 and 3), thereby allowing a flush of the TLB following the next context switch.

The LS_TLBInvalidateM signal may be used to indicate that the TLB is to be flushed if a modification has occurred. This signal may be held in a logic high state when the TLB flush filter is activated. A modification may include changes to underlying address translations or a change in status of the flush filter (such as when the counters overflow). The FF_TLBInvalidate signal may be asserted when LS_TLBInvalidateM signals is asserted as a logic high and the /CLR signal is asserted low (and inverted prior to its input into the AND gate).

The /CLR signal may be driven to a logic low state by one of several different conditions. These conditions may vary with alternative embodiments. In the embodiment shown, such conditions may include a reset of the flush filter (Reset signal), a modification of page data (Modify Page Data signal, shown as the Hit signal in FIG. 3), an overflow of either of the counters (Overflow Region Counter signal, Overflow Base Address Register Counter signal), or a signal to disable the flush filter (Disable Flush Filter signal). Signals for each of these conditions are present in the logic circuit of FIG. 5. The /CLR signal is typically held in a logic high state in the embodiment shown, and may propagate through a feedback circuit (including an OR gate) to become an input to the 7-input AND gate shown in the drawing. The FF_TLBInvalidate signal may also propagate through a feedback circuit and through the OR gate when it is asserted. Driving any of the conditional to a logic high state may result in a logic low input to the AND gate (due to the inverters), thereby causing the /CLR signal to be asserted in its logic low state.

Figure 6:
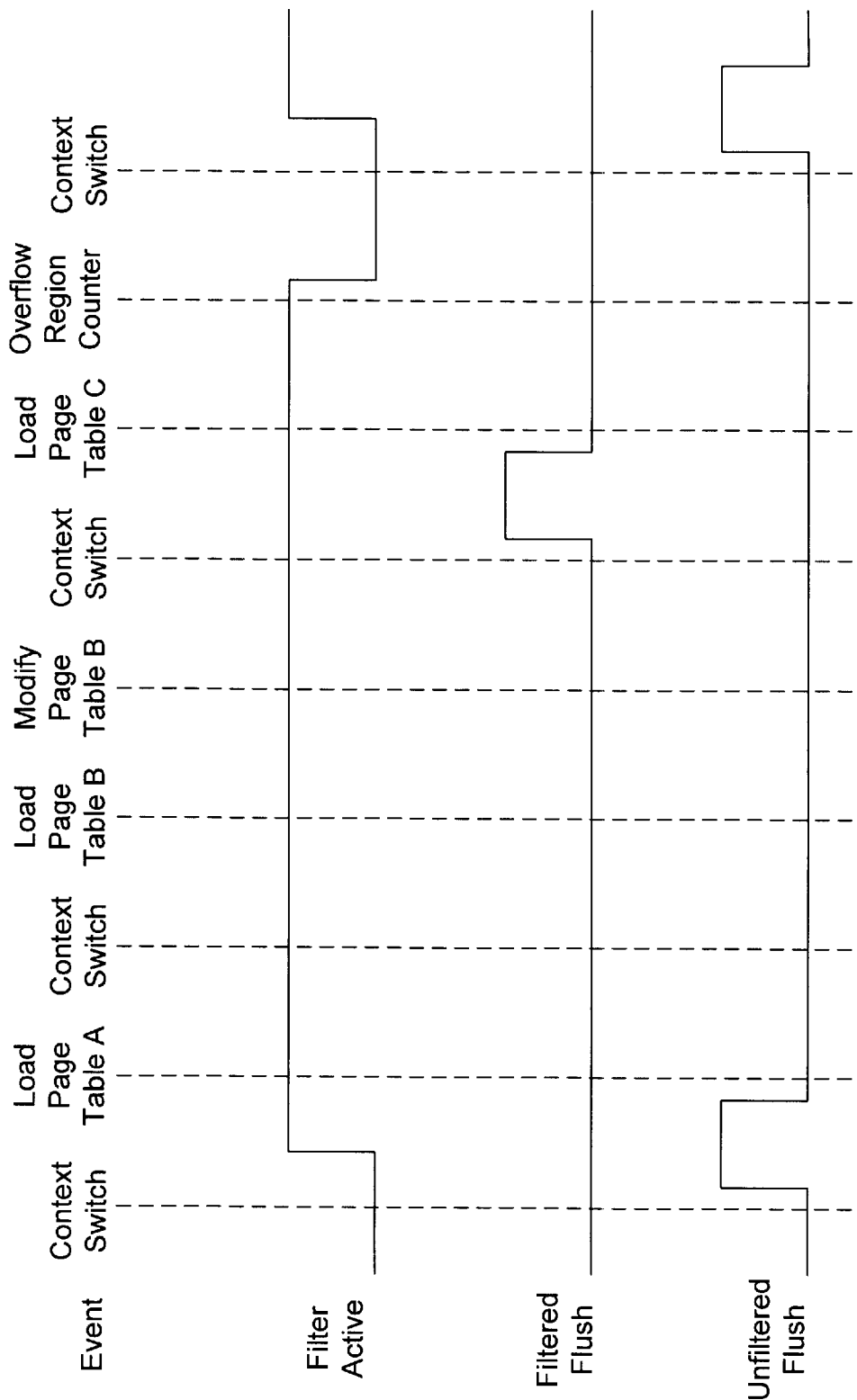
FIG. 6 is a timing diagram illustrating the operation of one embodiment of the TLB flush filter.

Moving now to FIG. 6, a timing diagram illustrating the operation of one embodiment of the TLB flush filter is shown. The diagram is intended to show the basic operation of the flush filter by way of example, and is not intended to cover all possible conditions or results that may occur. Furthermore, the diagram is not intended to characterize specific implementational details of the flush filter, which may vary with different embodiments.

The TLB flush filter may be initially activated by a first context switch. Since the flush filter was not activated prior to the first context switch, an unfiltered flush of the TLB may result. Following the first context switch, page table A is loaded into memory. Page table A is associated with the new context, and thus entries corresponding to this page table may be loaded into the region table of FIG. 3 as corresponding address translations are loaded into the TLB. Following the loading of page table A, another context switch occurs. In this case, a flush of the TLB may be prevented by the activated TLB flush filter. This may indicate that no condition which would necessitate a flush occurred between context switches. In the example shown, no modifications were made to page table A between context switches.

Following the second context switch, page table B is loaded into memory. Page table B may contain address translations, some of which may be loaded into the TLB. Following the loading of page table B into memory, page table B is modified. As such, it is possible that some address translations loaded into the TLB from page table B are no longer valid. Consequently, the TLB flush filter may allow a TLB flush (shown here as a filtered flush) to occur following the next context switch.

The next event to occur following the filtered flush is a loading of page table C. As discussed in reference to FIG. 3, a region counter keeps track of the CAM portion of the region table, and may overflow if the region table runs out of space for more entries. In the diagram shown, this occurs following the loading of page table C, causing the region counter to overflow. An overflow of the region counter may cause the deactivation of the TLB flush filter. Upon the first context switch following deactivation, the TLB may be flushed. This first context switch may also cause a re-activation of the TLB flush filter.

Figures 7A, 7B:
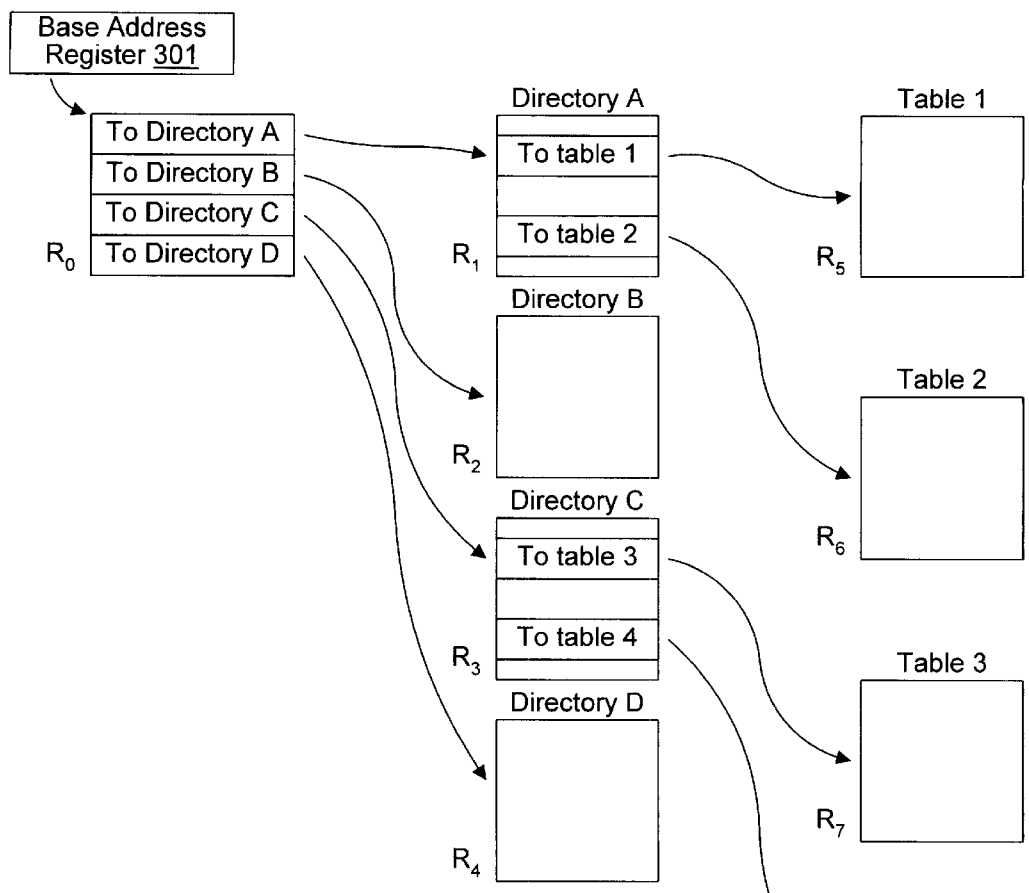
FIG. 7A is a block diagram illustrating a paging structure covered by entries in a region table.
FIG. 7B is a block diagram illustrating a region table with entries corresponding to the paging structure illustrated in FIG. 7A.

FIGS. 7A and 7B are block diagrams illustrating a paging structure covered by entries in a region table, and a region table with entries corresponding to the paging structure for one embodiment of TLB flush filter 40. In FIG. 7A, base address register 301 may store an address which points to a region ($R_0$) of page directory pointers. Each entry in the region points to a page directory.

Figure 8:
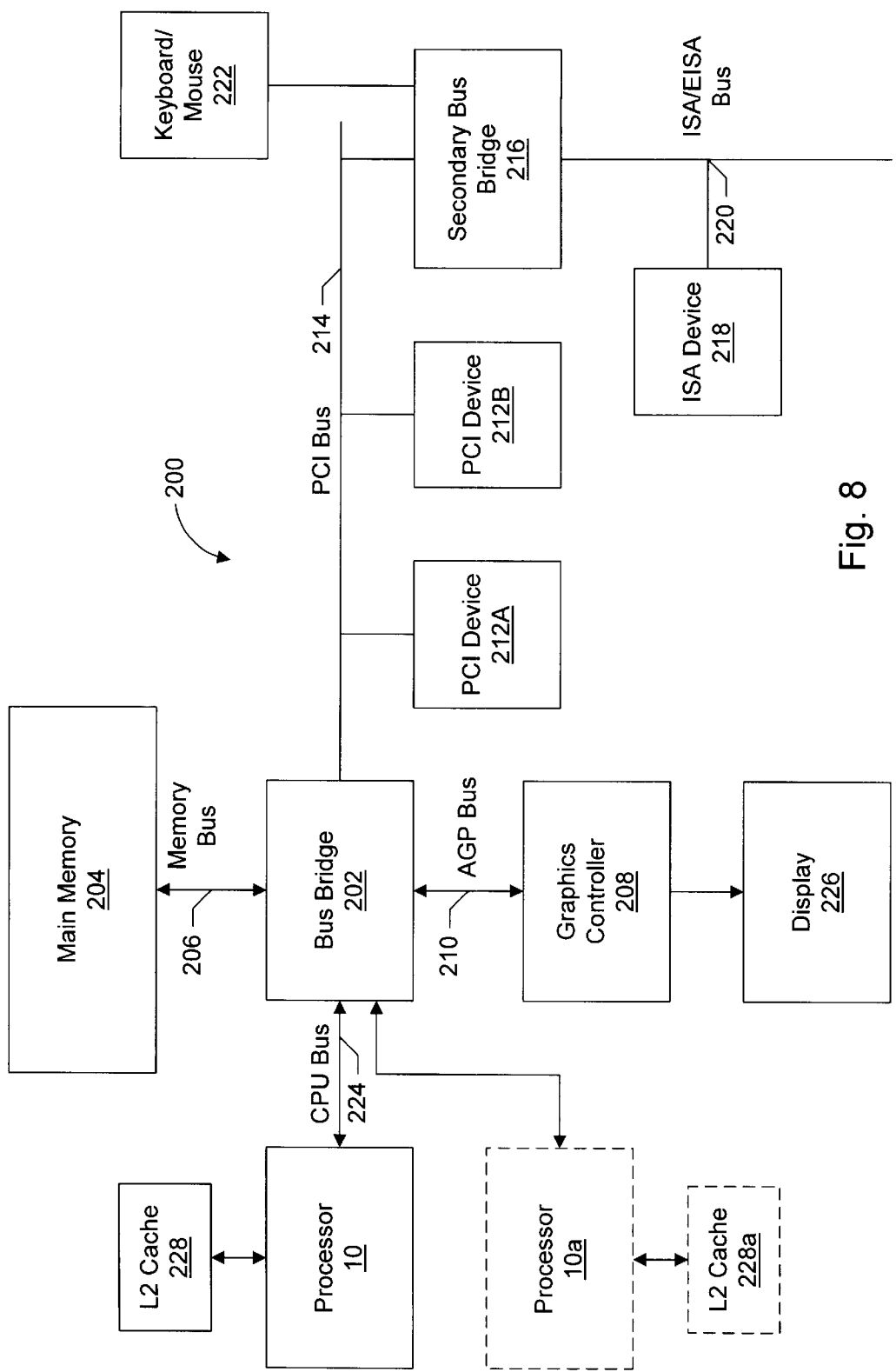
FIG. 8 is a block diagram of one embodiment of a computer system in which a TLB flush filter would be implemented.

Turning now to FIG. 8, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may flirter be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 5) or may share CPU bus 224 with processor 10. Furthermore, processor 10a may be coupled to an optional L2 cache 228a similar to L2 cache 228.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A processor comprising:
  a translation lookaside buffer (TLB) for storing address translations; and
  a TLB flush filter coupled to said TLB, wherein said TLB flush filter is configured to monitor blocks of memory from which said address translations have been read and cached into said TLB and to determine if any of said address translations in said blocks of memory have changed, wherein said TLB flush filter is further configured to, responsive to a context switch, allow said TLB to be flushed if said address translations have changed, and wherein said TLB flush filter is configured to prevent a flush of said TLB if said address translations have not changed.

2. The processor as recited in claim 1, wherein said TLB flush filter is activated by a first context switch.

3. The processor as recited in claim 2, wherein said first context switch causes a flush of said TLB.

4. The processor as recited in claim 1, wherein said TLB flush filter includes a region table for tracking said blocks of memory.

5. The processor as recited in claim 4, wherein said TLB flush filter is configured to detect a modification of a memory location within said blocks of memory, and wherein said TLB flush filter is configured to allow a flush of said TLB responsive to a next context switch and responsive to detecting said modification of said memory location.

6. The processor as recited in claim 4, wherein said region table includes a content addressable memory (CAM) and a random access memory (RAM).

7. The processor as recited in claim 6, wherein said CAM is configured to store a plurality of entries, wherein each of said plurality of entries includes address information associated with said blocks of memory.

8. The processor as recited in claim 7, wherein said TLB flush filter includes a counter configured to count the number of entries in said CAM.

9. The processor as recited in claim 8, wherein said TLB flush filter is deactivated when said counter overflows.

10. The processor as recited in claim 6, wherein said RAM is configured to store a plurality of entries, wherein each of said plurality of entries is configured to store a tag associated with a base address.

11. The processor as recited in claim 10, wherein said TLB flush filter includes a counter configured to provide a new tag responsive to a base address which misses said CAM.

12. The processor as recited in claim 11, wherein said TLB flush filter is deactivated when said counter overflows.

13. A method of operating a processor, the method comprising:

storing address translations in a translation lookaside buffer (TLB), said address translations loaded into said TLB from one or more blocks of memory;

determining if any address translations stored in said one or more blocks of memory have changed;

flushing said TLB if any of said address translations stored in said one or more blocks of memory have changed, said flushing responsive to a context switch; and preventing a flush of said TLB responsive to a context switch if none of said address translations stored in said one or more blocks of memory have changed, wherein a flush of said TLB is prevented by a TLB flush filter.

14. The method as recited in claim 13, wherein said TLB flush filter is activated by a first context switch.

15. The method as recited in claim 14, wherein said first context switch causes a flush of said TLB.

16. The method as recited in claim 13, wherein said TLB flush filter includes a region table, said region table configured to monitor said address translations stored in said one or more blocks of memory.

17. The method as recited in claim 16, wherein a flush of said TLB occurs responsive to the next context switch after detection of a change to one or more of said address translations stored in said one or more blocks of memory, said detection occurring in said region table.

18. The method as recited in claim 16, wherein said region table includes a content addressable memory (CAM) and a random access memory (RAM.

19. The method as recited in claim 18, wherein said CAM is configured to store a plurality of entries, wherein each of said entries includes information associated with said one or more blocks of memory.

20. The method as recited in claim 19, wherein a counter is configured to count the number of entries stored in said CAM.

21. The method as recited in claim 20, wherein an overflow of said counter causes said TLB flush filter to be deactivated.

22. The method as recited in claim 18, wherein said RAM is configured to store a plurality of entries, each of said entries including a base address and a tag associated with said base address.

23. The method as recited in claim 22, wherein a counter is configured to count the number of entries in said RAM.

24. The method as recited in claim 23, wherein said TLB flush filter is deactivated when said counter overflows.

25. An apparatus comprising:

a memory circuit having a plurality of entries, wherein each of said plurality of entries is configured to store an address of a memory block for storing address translations; and a circuit coupled to said memory circuit, wherein said circuit is configured to allow a flush of a translation lookaside buffer (TLB) responsive to a context switch if said address translations corresponding to said plurality of entries stored in said memory circuit have changed, and wherein said filter circuit is configured to prevent a flush of said TLB if said address translations have not changed.

* * * * *

UNITED STATES PATENT AND TRADEMARK OFFICE
CERTIFICATE OF CORRECTION

PATENT NO. : 6,510,508 B1
DATED : January 21, 2003
INVENTOR(S) : Zuraski, Jr. et al.

It is certified that error appears in the above-identified patent and that said Letters Patent is hereby corrected as shown below:

Title page,
Item [*], Notice, should read -- Subject to any disclaimer, the term of this patent is extended or adjusted under 35 U.S.C. 154(b) by 263 days. --

Signed and Sealed this

Eleventh Day of November, 2003

JAMES E. ROGAN
*Director of the United States Patent and Trademark Office*